United States Patent
Gan et al.

(10) Patent No.: US 10,606,808 B2
(45) Date of Patent: Mar. 31, 2020

(54) SMART SUGGESTED SHARING CONTACTS

(71) Applicant: Microsoft Technology Licensing, LLC, Redmond, WA (US)

(72) Inventors: Patrick Michael Gan, Salem, MA (US); Douglas Lane Milvaney, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/914,003

(22) Filed: Mar. 7, 2018

(65) Prior Publication Data

US 2019/0243909 A1     Aug. 8, 2019

Related U.S. Application Data

(60) Provisional application No. 62/627,298, filed on Feb. 7, 2018.

(51) Int. Cl.

| G06F 16/176 | (2019.01) |
|---|---|
| G06Q 10/10 | (2012.01) |
| G06F 17/27 | (2006.01) |
| H04L 29/06 | (2006.01) |
| G06F 21/62 | (2013.01) |
| G06F 3/0482 | (2013.01) |

(52) U.S. Cl.
CPC ........ *G06F 16/176* (2019.01); *G06F 17/2765* (2013.01); *G06Q 10/101* (2013.01); *G06F 3/0482* (2013.01); *G06F 21/6218* (2013.01); *H04L 63/101* (2013.01)

(58) Field of Classification Search
None
See application file for complete search history.

(56) References Cited

U.S. PATENT DOCUMENTS

| 2012/0222132 | A1* | 8/2012 | Burger | G06F 21/604 |
|---|---|---|---|---|
| | | | | 726/28 |
| 2013/0054509 | A1* | 2/2013 | Kass | G06Q 10/00 |
| | | | | 706/55 |
| 2017/0147796 | A1* | 5/2017 | Sardesai | G06F 21/10 |
| 2017/0286416 | A1 | 10/2017 | Gan et al. | |
| 2017/0353466 | A1* | 12/2017 | Weaver | G06F 21/6218 |
| 2017/0357521 | A1 | 12/2017 | Paek et al. | |
| 2018/0109574 | A1* | 4/2018 | Vigoda | G06Q 10/101 |
| 2018/0129371 | A1* | 5/2018 | Fowler | G06Q 10/06312 |
| 2019/0108271 | A1* | 4/2019 | Vikramaratne | G06F 16/258 |

\* cited by examiner

*Primary Examiner* — Scott B Christensen
(74) *Attorney, Agent, or Firm* — Rainier Patents, P.S.

(57) ABSTRACT

Described herein is a system and method for suggesting other user(s) with whom to share an electronic file. During editing of the electronic file, an intent of a user to share the electronic file can be inferred. For each of a plurality of other users, a probability indicative of a likelihood that the user would like to share the electronic file with the particular other user is calculated. Based upon the calculated probabilities, at least one other user to suggest to the user for sharing of the electronic file is identified. Information regarding the identified at least one other user is displayed. Based upon a user selection of another user to share the electronic file with, an algorithm used to calculate the probabilities can be updated.

20 Claims, 4 Drawing Sheets

SMART SUGGESTED SHARING CONTACTS

RELATED APPLICATION

This application claims priority to U.S. Provisional Application No. 62/627,298, filed Feb. 7, 2018, entitled "Smart Suggested Sharing Contacts", the disclosure of which is hereby incorporated by reference herein in its entirety.

BACKGROUND

Word processing, spreadsheet, database, slide presentation, electronic mail, drawing, note taking, web browser, media player, and game applications allow users to view, create, and/or edit documents. Frequently, a user may desire to share a document with other user(s) in order to obtain the other user(s) feedback including comment(s), suggestion(s) and/or changes regarding the document.

SUMMARY

Described herein is a system for suggesting another user with whom to share an electronic file, comprising: a computer comprising a processor and a memory having computer-executable instructions stored thereupon which, when executed by the processor, cause the computer to: during editing of the electronic file, infer an intent of a user to share the electronic file; for each of a plurality of other users, calculate a probability indicative of a likelihood that the user would like to share the electronic file with the particular other user; based upon the calculated probabilities, identify at least one other user to suggest to the user for sharing of the electronic file; and, display information regarding the identified at least one other user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
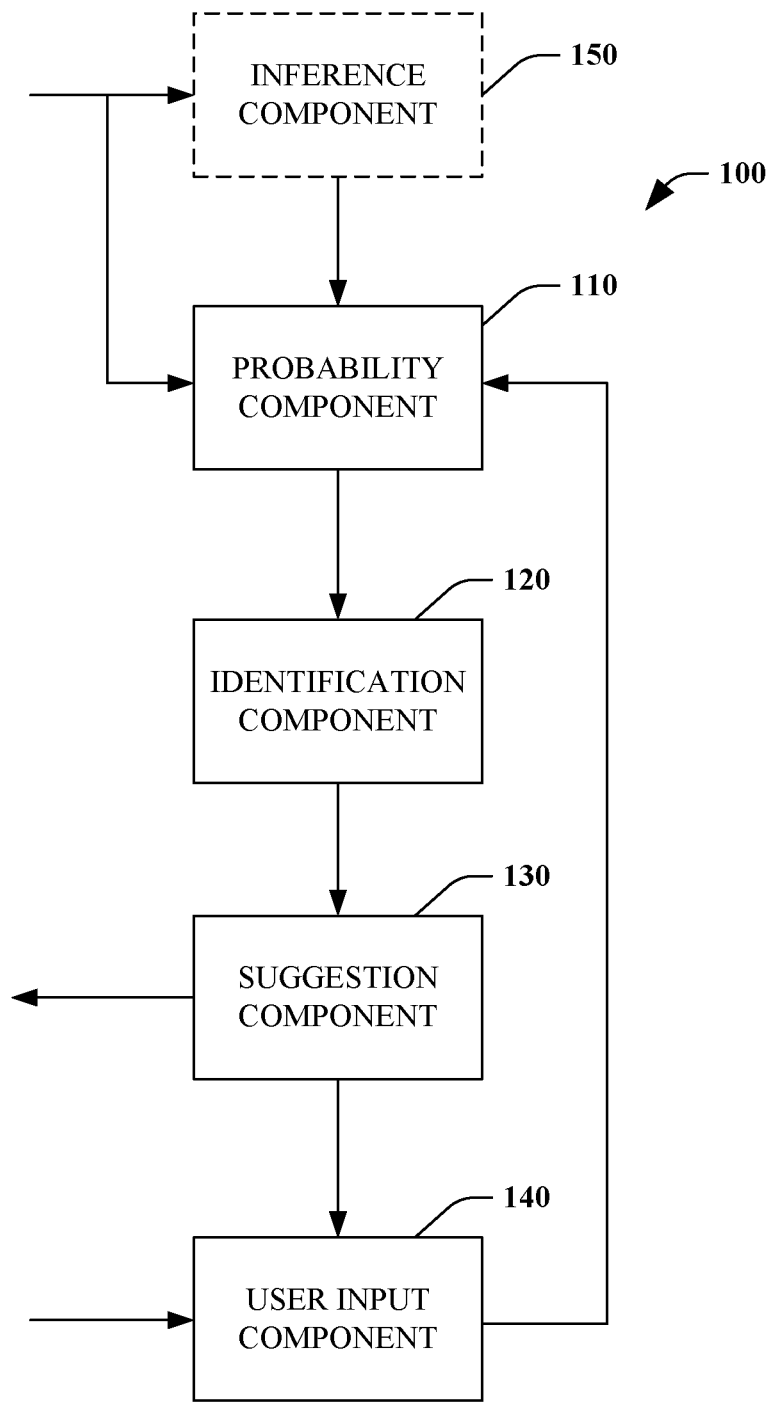
FIG. 1 is a functional block diagram that illustrates a system for suggesting another user with whom to share an electronic file.

Various technologies pertaining to inferring an intent of a user to share an electronic file and identifying other user(s) with whom the user would likely desire to share the electronic file are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding inferring an intent of a user to share an electronic file and identifying other user(s) with whom the user would likely desire to share the electronic file. What follows are one or more exemplary systems and methods.

Aspects of the subject disclosure pertain to the technical problem of identifying other user(s) with whom a user would like to share an electronic file. The technical features associated with addressing this problem involve during editing of an electronic file, inferring an intent of the user to share the electronic file. For each of a plurality of other users, a probability indicative of a likelihood that the user would share the electronic file with the particular other user is calculated. Based upon the calculated probabilities, at least one other user to suggest to the user for sharing of the electronic file is identified. Information regarding the identified at least one other user is displayed. Accordingly, aspects of these technical features exhibit technical effects of more efficiently and effectively increasing user efficiency, reducing processing consumption, and/or reducing network bandwidth, as users can share information in a more efficient manner.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for suggesting another user with whom to share an electronic file 100 is illustrated. The system 100 can provide information to a user regarding other user(s) with whom the user would likely desire to share the electronic file.

The system 100 includes a probability component 110, an identification component 120, a suggestion component 130, and a user input component 140. In some embodiments, a desire of the user to share the electronic file can be determined based upon explicit input from the user, for example, by invoking a "share file" command. In response to receiving explicit input from the user, the probability component 110 can be triggered.

In some embodiments, the desire of the user to share the electronic file can be inferred. In this scenario, the system 100 further includes an inference component 150. During editing of the electronic file, the inference component 150 can infer an intent of a user to share the electronic file. In response to inferring an intent of the user to share the electronic file, the inference component 150 can trigger the probability component 110.

In some embodiments, the inference can be based upon one or more file management events related to the electronic file, for example, on file create, on file move, and/or on file rename. In some embodiments, the inference can be temporally-based, for example, upon expiration of a predetermined period of time. In some embodiments, the inference can be based upon a quantity of content added to the electronic file, for example, upon entry of a predetermined quantity of content (e.g., characters, paragraphs, pages, section, and the like).

Based upon a received explicit command to share the electronic file and/or an inferred desire to share the electronic file determined by the inference component 150, for each of a plurality of other users, the probability component 110, calculates a probability indicative of a likelihood that the user desires to share the electronic file with a particular other user. In some embodiments, the plurality of other users is determined based upon contacts stored on the user's computer. In some embodiments, the plurality of other users is determined based upon information stored on a directory of other users (e.g., on a server associated with an entity of which the user is a member). In some embodiments, the plurality of other users is determined based upon historical information regarding file sharing of the user. In some embodiments, the plurality of other users is determined based upon contacts stored on the user's computer, information stored on a directory of other users, and/or historical information regarding file sharing of the user.

In some embodiments, calculation of the probability indicative of a likelihood that the user desires to share the electronic file with a particular other user can be performed using one or more probabilistic algorithms including a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, and/or a Gradient Boost & Adaboost algorithm.

In some embodiments, calculation of the probability indicative of a likelihood that the user desires to share the electronic file with a particular other user can be based upon an analysis of content of the electronic file. The analysis of content of the electronic file can identify one or more subjects of the electronic file which the probability component 110 can utilize to calculate probabilities indicative of a likelihood that the user desires to share the electronic file with particular other users.

In some embodiments, calculation of the probability indicative of a likelihood that the user desires to share the electronic file with a particular other user can be based upon metadata associated with the electronic file. For example, the metadata can specify one or more subjects and/or projects associated with the electronic file.

In some embodiments, calculation of the probability indicative of a likelihood that the user desires to share the electronic file with a particular other user can be based upon information about the user. For example, the information can include membership in one or more groups, hierarchical information regarding the user within an organization, a specialty of the user, and the like.

In some embodiments, calculation of the probability indicative of a likelihood that the user desires to share the electronic file with a particular other user can be based upon information about other user(s). For example, the information can include membership in one or more groups, hierarchical information regarding the particular other user within an organization, a specialty of the particular other user, and the like.

In some embodiments, calculation of the probability indicative of a likelihood that the user desires to share the electronic file with a particular other user can be based upon a stage in an editing lifecycle of the electronic file. For example, early in the editing lifecycle, the user may be less likely to desire to share the electronic file with a manager or other person above them in an organizational hierarchy.

In some embodiments, calculation of the probability indicative of a likelihood that the user desires to share the electronic file with a particular other user can be based upon user(s) who have work on similar electronic file(s) (e.g., based on file name, file location, and/or content of the electronic file). In some embodiments, calculation of the probability indicative of a likelihood that the user desires to share the electronic file with a particular other user can be based upon a skill set similar to content of the electronic file (e.g., suggest a data contact if working on a dashboard/experimentation plan).

In some embodiments, calculation of the probability indicative of a likelihood that the user desires to share the electronic file with a particular other user can be based upon the user's previous interaction(s) external to the electronic file with other user(s) in a network of the user (e.g., Outlook®, Teams, etc.). For example, content of those interaction(s) can be used to determine a probability as to whether the other user(s) would be a useful collaborator on the electronic file (e.g., based on an analysis of the content of the electronic file).

In some embodiments, calculation of the probability indicative of a likelihood that the user desires to share the electronic file with a particular other user can be based upon an analysis of content of other file(s) (e.g., in a privacy-preserving manner) in a same storage location to determine whether there are other user(s) the other file(s) have been shared with and/or edited by that should be suggested contact(s) for the electronic file. In some embodiment, in order to preserve data integrity and/or privacy, only file(s) to which the user has access are included in the analysis.

Based upon the calculated probabilities, the identification component 120 identifies at least one other user to suggest to the user for sharing of the electronic file. In some embodiments, the identified other user(s) are ranked hierarchically based upon the calculated probabilities. In some embodiments, identification of the other user(s) is based upon a predetermined quantity to be displayed to the user (e.g., only the predetermined quantity of other user(s) are identified). In some embodiments, identification of the other user(s) is based upon a predetermined probability threshold with other user(s) having calculated probabilities of equal to and/or greater than the predetermined probability threshold being identified. In some embodiments, a quantity of other user(s) identified is based upon historical usage of the user.

The suggestion component 130 provides (e.g., displays) information regarding the other user(s) identified by the identification component 120. In some embodiments, the user input component 140 receives input from the user regarding selected other user(s) with whom to share the electronic file. Based upon the received input, the user input component 150 can cause the electronic file to be shared with the selected other user(s). In some embodiments, the user input component 140 receives input from the user to not share the electronic file. Based upon the received input to not share the electronic file, the electronic file is not shared.

In some embodiments, the user input component 150 provides the received user input (e.g., selected other user(s) with whom to share the electronic file and/or input to not share the electronic file) to the probability component 120. In response to the received user input, the probability component 120 can adaptively update the machine learning algorithm(s) used to calculate the probabilities indicative of a likelihood that the user desires to share the electronic file with other users.

Figure 2:
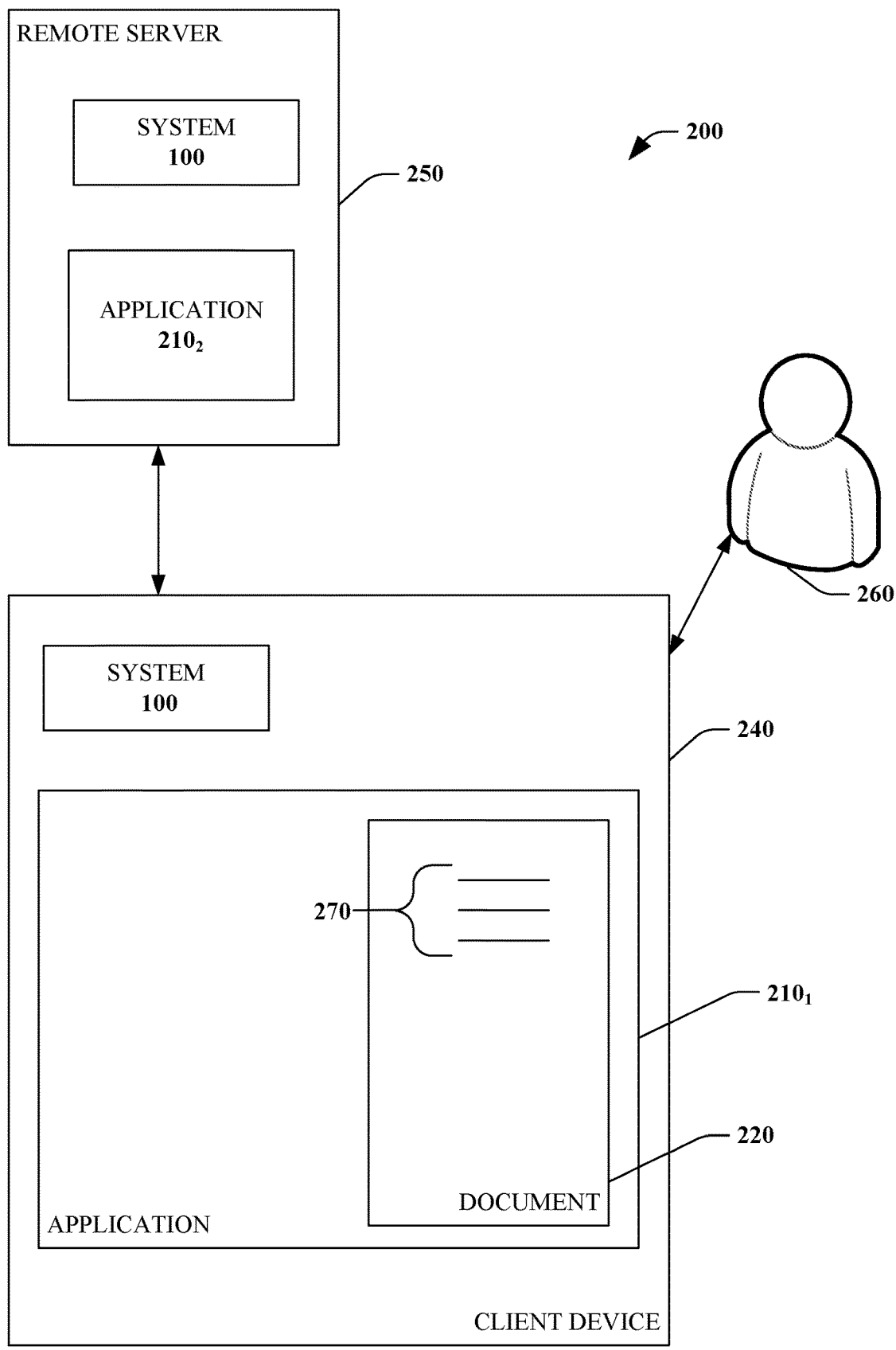
FIG. 2 is a functional block diagram that illustrates a system for sharing an electronic document.

Referring to FIG. 2, a system for sharing an electronic document 200 is illustrated. The system 200 includes an application 210₁, 210₂ (generally, 210) used to view, generate, and/or edit an electronic document 220. Examples of suitable applications 210 include, but are not limited to, word processing, spreadsheet, database, slide presentation, electronic mail, drawing, note taking, web browser, media player, and game applications.

In some embodiments, the application 210₁ is a thick client application stored locally on a client device 240. In some embodiments, the application 210₂ is thin client application (i.e., web applications) that resides on a remote service 250 and accessible over a network or combination of networks (e.g., the Internet, wide area networks, local area networks). A thin client application 210₂ can be hosted in a browser-controlled environment or coded in a browser-supported language and reliant on a common web browser to render the application executable on the client device 240.

A user 260 can use the application 210 to create a new document 220, edit an existing document 220, and/or view an existing document 220. The application 210 receives input from the user 260, for example, text input, from one or more input devices including, for example, a keyboard, a computer mouse, a remote control. In some embodiments, the application 210 receives input from the user 260 through a Natural User Interface (NUI) which enables the user to interact with the client device 240 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in content 270 being added to the document 220. In some embodiments, content 270 is added within a document canvas (e.g., a page in a word processing document, a spreadsheet in a spreadsheet document, a slide in a presentation document) of the document 220.

The system 200 can include the system 100 that provides information to the user 260 regarding other user(s) with whom the user would likely desire to share the document 220. In some embodiments, the system 100 executes on the remote server 250. In some embodiments, the system 100 executes on the client device 240.

Figure 3:
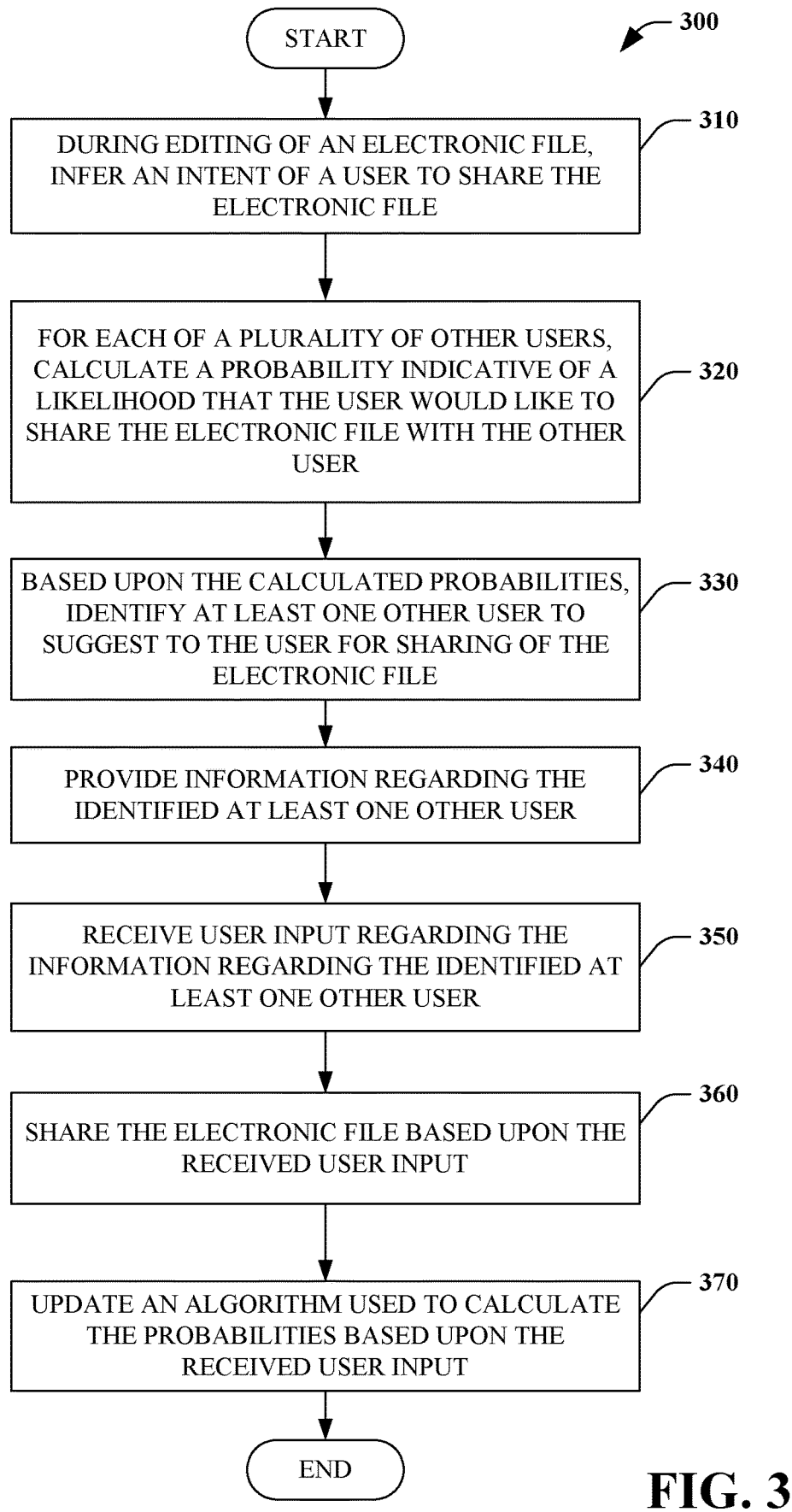
FIG. 3 illustrates an exemplary method of suggesting another user with whom to share an electronic file.

FIG. 3 illustrates an exemplary methodology for suggesting another user with whom to share an electronic file. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of suggesting another user with whom to share an electronic file 300 is illustrated. In some embodiments, the method 300 is performed by the system 100.

At 310, during editing of an electronic file, an intent of a user to share the electronic file is inferred. At 320, for each of a plurality of other users, a probability indicative of a likelihood that the user would like to share the electronic file with the other user is calculated. At 330, based upon the calculated probabilities, at least one other user to suggest to the user for sharing of the electronic file is identified.

At 340, information regarding the identified at least one other user is provided (e.g., displayed to the user). At 350, user input regarding the information regarding the identified at least one other user is received.

At 360, the electronic file is shared based upon the received user input. At 370, an algorithm used to calculate the probabilities is updated based upon the received user input.

Described herein is a system for suggesting another user with whom to share an electronic file, comprising: a computer comprising a processor and a memory having computer-executable instructions stored thereupon which, when executed by the processor, cause the computer to: during editing of the electronic file, infer an intent of a user to share the electronic file; for each of a plurality of other users, calculate a probability indicative of a likelihood that the user would like to share the electronic file with the particular other user; based upon the calculated probabilities, identify at least one other user to suggest to the user for sharing of the electronic file; and, display information regarding the identified at least one other user.

The system can include wherein the intent of the user to share the electronic file is inferred based upon a file management event comprising at least one of creating the electronic file, moving of the electronic file or renaming of the electronic file. The system can further include wherein the intent of the user to share the electronic file is inferred based expiration of a predetermined period of time.

The system can include the memory having further computer-executable instructions stored thereupon which, when executed by the processor, cause the computer to: receive user input regarding a selected other user with whom to share the electronic file; and share the electronic file with the selected other user. The system can further include the memory having further computer-executable instructions stored thereupon which, when executed by the processor, cause the computer to: update an algorithm used to calculate the probabilities based upon the receive user input.

The system can include wherein the probabilities are calculated based upon at least one of contacts stored on the computer, information stored on a directory of other users, or historical information regarding file sharing of the user. The system can further include wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm. The system can include wherein the probabilities are calculated based upon at least one of an analysis of content of the electronic file, or metadata associated with the electronic file. The system can include wherein the probabilities are calculated based upon at least one of information about the user or information about the other users. The system can include wherein the probabilities are calculated based upon at least one of a stage in an editing lifecycle of the electronic file, other users who have work on similar electronic files, or a skill set similar to content of the electronic file. The system can further include wherein the probabilities are calculated based upon a previous interaction of the user external to the electronic file with at least one of other user. The system can include wherein the probabilities are calculated based upon an analysis of content of other files.

Described herein is a method of suggesting another user with whom to share an electronic file, comprising: during editing of the electronic file, inferring an intent of a user to share the electronic file; for each of a plurality of other users, calculating a probability indicative of a likelihood that the user would like to share the electronic file with the particular other user; based upon the calculated probabilities, identifying at least one other user to suggest to the user for sharing of the electronic file; and, displaying information regarding the identified at least one other user. The method can include wherein inferring the intent of the user to share the electronic file is based upon a file management event comprising at least one of creating the electronic file, moving of the electronic file or renaming of the electronic file. The method can further include receiving user input regarding a selected other user with whom to share the electronic file; sharing the electronic file with the selected other user; and updating an algorithm used to calculate the probabilities based upon the receive user input.

The method can include wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm. The method can include wherein the probabilities are calculated based upon a previous interaction of the user external to the electronic file with at least one of other user. The method can include wherein the probabilities are calculated based upon at least one of an analysis of content of the electronic file, or metadata associated with the electronic file.

Described herein is a computer storage media storing computer-readable instructions that when executed cause a computing device to: during editing of the electronic file, infer an intent of a user to share the electronic file; for each of a plurality of other users, calculate a probability indicative of a likelihood that the user would like to share the electronic file with the particular other user; based upon the calculated probabilities, identify at least one other user to suggest to the user for sharing of the electronic file; and, display information regarding the identified at least one other user. The computer storage media can include wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

Figure 4:
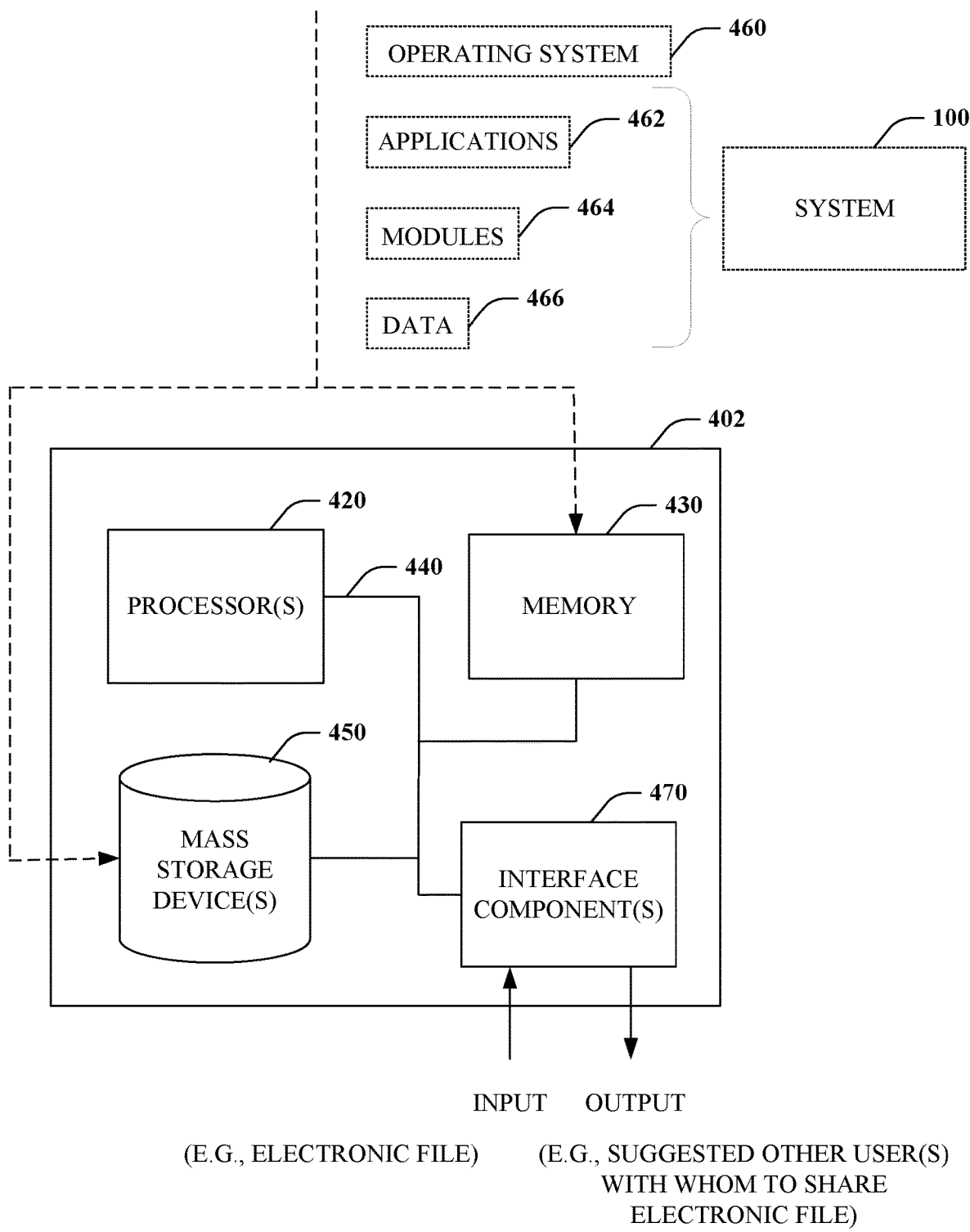
FIG. 4 is a functional block diagram that illustrates an exemplary computing system.

With reference to FIG. 4, illustrated is an example general-purpose computer or computing device 402 (e.g., mobile phone, desktop, laptop, tablet, watch, server, handheld, programmable consumer or industrial electronics, set-top box, game system, compute node, etc.). For instance, the computing device 402 may be used in a system for suggesting another user with whom to share an electronic file 100.

The computer 402 includes one or more processor(s) 420, memory 430, system bus 440, mass storage device(s) 450, and one or more interface components 470. The system bus 440 communicatively couples at least the above system constituents. However, it is to be appreciated that in its simplest form the computer 402 can include one or more processors 420 coupled to memory 430 that execute various computer executable actions, instructions, and or components stored in memory 430. The instructions may be, for instance, instructions for implementing functionality described as being carried out by one or more components discussed above or instructions for implementing one or more of the methods described above.

The processor(s) 420 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 420 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 420 can be a graphics processor.

The computer 402 can include or otherwise interact with a variety of computer-readable media to facilitate control of the computer 402 to implement one or more aspects of the claimed subject matter. The computer-readable media can be any available media that can be accessed by the computer 402 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 402. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 430 and mass storage device(s) 450 are examples of computer-readable storage media. Depending on the exact configuration and type of computing device, memory 430 may be volatile (e.g., RAM), non-volatile (e.g., ROM, flash memory, etc.) or some combination of the two. By way of example, the basic input/output system (BIOS), including basic routines to transfer information between elements within the computer 402, such as during start-up, can be stored in nonvolatile memory, while volatile memory can act as external cache memory to facilitate processing by the processor(s) 420, among other things.

Mass storage device(s) 450 includes removable/non-removable, volatile/non-volatile computer storage media for storage of large amounts of data relative to the memory 430. For example, mass storage device(s) 450 includes, but is not limited to, one or more devices such as a magnetic or optical disk drive, floppy disk drive, flash memory, solid-state drive, or memory stick.

Memory 430 and mass storage device(s) 450 can include, or have stored therein, operating system 460, one or more applications 462, one or more program modules 464, and data 466. The operating system 460 acts to control and allocate resources of the computer 402. Applications 462 include one or both of system and application software and can exploit management of resources by the operating system 460 through program modules 464 and data 466 stored in memory 430 and/or mass storage device (s) 450 to perform one or more actions. Accordingly, applications 462 can turn a general-purpose computer 402 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 462, and include one or more modules 464 and data 466 stored in memory and/or mass storage device(s) 450 whose functionality can be realized when executed by one or more processor(s) 420.

In accordance with one particular embodiment, the processor(s) 420 can correspond to a system on a chip (SOC) or like architecture including, or in other words integrating, both hardware and software on a single integrated circuit substrate. Here, the processor(s) 420 can include one or more processors as well as memory at least similar to processor(s) 420 and memory 430, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 402 also includes one or more interface components 470 that are communicatively coupled to the system bus 440 and facilitate interaction with the computer 402. By way of example, the interface component 470 can be a port (e.g., serial, parallel, PCMCIA, USB, FireWire, etc.) or an interface card (e.g., sound, video, etc.) or the like. In one example implementation, the interface component 470 can be embodied as a user input/output interface to enable a user to enter commands and information into the computer 402, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 470 can be embodied as an output peripheral interface to supply output to displays (e.g., LCD, LED, plasma, etc.), speakers, printers, and/or other computers, among other things. Still further yet, the interface component 470 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for suggesting another user with whom to share an electronic file, the system comprising:
a computer comprising a processor and a memory having computer-executable instructions stored thereupon which, when executed by the processor, cause the computer to:
during editing of the electronic file, infer an intent of a user to share the electronic file;
in response to the inferred intent, for each particular other user of a plurality of other users, calculate a probability indicative of a likelihood that the user would like to share the electronic file with the particular other user based, at least in part, upon which stage of a plurality of stages in an editing lifecycle the electronic file is in;
based upon the calculated probabilities, identify at least one other user to suggest to the user for sharing of the electronic file; and,
display information regarding the identified at least one other user.

2. The system of claim 1, wherein the intent of the user to share the electronic file is inferred based upon a file management event comprising at least one of creating the electronic file, moving of the electronic file or renaming of the electronic file.

3. The system of claim 1, wherein the intent of the user to share the electronic file is inferred based upon expiration of a predetermined period of time.

4. The system of claim 1, the memory having further computer-executable instructions stored thereupon which, when executed by the processor, cause the computer to:
receive user input regarding a selected other user with whom to share the electronic file; and
share the electronic file with the selected other user.

5. The system of claim 4, the memory having further computer-executable instructions stored thereupon which, when executed by the processor, cause the computer to:
update an algorithm used to calculate the probabilities based upon the received user input.

6. The system of claim 1, wherein the probabilities are calculated based upon at least one of contacts stored on the computer, information stored on a directory of other users, or historical information regarding file sharing of the user.

7. The system of claim 1, wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

8. The system of claim 1, wherein the probabilities are calculated based upon at least one of an analysis of content of the electronic file, or metadata associated with the electronic file.

9. The system of claim 1, wherein the probabilities are calculated based upon at least one of information about the user or information about the other users.

10. The system of claim 1, wherein the probabilities are calculated based upon at least one of individual other users who have worked on similar electronic files, or a skill set similar to content of the electronic file.

11. The system of claim 1, wherein the probabilities are calculated based upon a previous interaction of the user external to the electronic file with at least one of the plurality of other users.

12. The system of claim 1, wherein the probabilities are calculated based upon an analysis of content of other files.

13. A method of suggesting another user with whom to share an electronic file, the method comprising:
during editing of the electronic file, inferring an intent of a user to share the electronic file;
in response to the inferred intent, for each particular other user of a plurality of other users, calculating a probability indicative of a likelihood that the user would like to share the electronic file with the particular other user based, at least in part, upon which stage of a plurality of stages in an editing lifecycle the electronic file is in;
based upon the calculated probabilities, identifying at least one other user to suggest to the user for sharing of the electronic file; and,
displaying information regarding the identified at least one other user.

14. The method of claim 13, wherein inferring the intent of the user to share the electronic file is based upon a file management event comprising at least one of creating the electronic file, moving of the electronic file or renaming of the electronic file.

15. The method of claim 13, further comprising:
receiving user input regarding a selected other user with whom to share the electronic file;
sharing the electronic file with the selected other user; and
updating an algorithm used to calculate the probabilities based upon the received user input.

16. The method of claim 13, wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

17. The method of claim 13, wherein the probabilities are calculated based upon a previous interaction of the user external to the electronic file with at least one of the plurality of other users.

18. The method of claim 13, wherein the probabilities are calculated based upon at least one of an analysis of content of the electronic file, or metadata associated with the electronic file.

19. A computer storage media storing computer-readable instructions that when executed cause a computing device to:
during editing of an electronic file, infer an intent of a user to share the electronic file;
in response to the inferred intent, for each particular other user of a plurality of other users, calculate a probability indicative of a likelihood that the user would like to share the electronic file with the particular other user based, at least in part, upon which stage of a plurality of stages in an editing lifecycle the electronic file is in;
based upon the calculated probabilities, identify at least one other user to suggest to the user for sharing of the electronic file; and,
display information regarding the identified at least one other user.

20. The computer storage media of claim 19, wherein the probabilities are calculated using an algorithm comprising at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

* * * * *